United States Patent [19]

Schiffers et al.

[11] 4,308,105

[45] Dec. 29, 1981

[54] METHOD OF AND APPARATUS FOR DECONTAMINATION OF RADIOACTIVE WASTE WATER

[75] Inventors: Ansgar Schiffers, Aachen; Wolfgang Oschmann, Bergheim; Joachim Brandt, Wenden; Dietrich Leith, Olpe, all of Fed. Rep. of Germany

[73] Assignee: Apparatebau Rothemühle Brandt & Kritzler, Rothemühle, Fed. Rep. of Germany

[21] Appl. No.: 37,831

[22] Filed: May 10, 1979

[30] Foreign Application Priority Data

May 13, 1978 [DE] Fed. Rep. of Germany ....... 2821097

[51] Int. Cl.³ ........................ B01D 3/00; B03C 3/78

[52] U.S. Cl. .................................... 202/197; 55/118; 55/126; 55/135; 55/136; 55/DIG. 9; 159/6 R; 159/DIG. 2; 159/DIG. 12; 252/301.1 W; 252/361

[58] Field of Search ...................... 55/2, 9, 11, 27, 69, 55/117-118, 126, 135-136, DIG. 9; 210/243; 202/182, 197; 203/10, 20, 40; 159/DIG. 2, 6 R, DIG. 12; 252/301.1 W, 361

[56] References Cited

U.S. PATENT DOCUMENTS

| | | | |
|---|---|---|---|
| 1,232,395 | 7/1917 | Schmidt et al. | 55/9 X |
| 1,289,984 | 12/1918 | Welch | 203/40 X |
| 1,345,437 | 7/1920 | Fehr | 203/20 X |
| 1,399,441 | 12/1921 | Petersen | 55/117 |
| 2,061,045 | 11/1936 | Ruder et al. | 55/136 |
| 2,077,996 | 4/1937 | Hall | 55/242 X |
| 2,324,663 | 7/1943 | Aiton | 202/180 |
| 2,813,823 | 11/1957 | Putman | 203/40 X |
| 2,960,449 | 11/1960 | Williamson | 202/197 X |
| 3,056,749 | 10/1962 | Griffith | 252/361 |
| 3,080,300 | 3/1963 | Smith | 159/6 R X |
| 3,347,755 | 10/1967 | Brooks | 202/197 X |
| 3,933,576 | 1/1976 | Rushton | 252/301.1 W X |
| 4,043,875 | 8/1977 | Rajakovics et al. | 252/301.1 W X |
| 4,120,933 | 10/1978 | Silver | 252/301.1 W X |

FOREIGN PATENT DOCUMENTS

| | | | |
|---|---|---|---|
| 2051526 | 5/1971 | Fed. Rep. of Germany | 252/361 |
| 2361791 | 6/1975 | Fed. Rep. of Germany | 252/301.1 W |

OTHER PUBLICATIONS

*Chemical Abstracts*, vol. 44, No. 13, Jul. 10, 1950, p. 5668, Kolarow, N., "The Purity of Distilled Water".

*Primary Examiner*—Kathleen J. Prunner
*Attorney, Agent, or Firm*—Karl F. Ross

[57] ABSTRACT

A method of and an apparatus for removing radionuclides from a radioactively contaminated liquid, especially water from the sump of a nuclear electric-power generating plant, in which the waste water is evaporated to produce a vapor phase containing radionuclides in the form of liquid or solid aerosol-dispersed particles which are collected by passing the vapor through an electric field. Preferably a plurality of such fields are traversed in succession by the aerosol.

3 Claims, 2 Drawing Figures

METHOD OF AND APPARATUS FOR DECONTAMINATION OF RADIOACTIVE WASTE WATER

FIELD OF THE INVENTION

The present invention relates to a method of and to an apparatus for the decontamination of radioactive waste water, and, more particularly, to a method of and an apparatus for removing radionuclides from waste water containing same, e.g. the sump product of nuclear electric-power generating plants.

BACKGROUND OF THE INVENTION

While radioactive waste water, i.e. waste water containing radioactive nuclides or radionuclides, can result from any industrial applications of nuclear energy, they are most frequently obtained as the sump product of nuclear electric-power generating stations.

To prevent dispersal of radioactivity into the environment, the radioactive waste water is subjected to treatment, thereby increasing the concentration of the resulting product in radionuclides and reducing the volume of the waste which must be stored or handled.

A typical approach to the decontamination of radionuclide recovery and disposal of such contaminated waste water is to subject the same to evaporation.

In prior-art systems, the evaporation is carried out by introducing the radioactive waste water into a circulation evaporator which transforms the water into a vapor phase. The radionuclides, which are in the form of impurities in the water, are transformed during the vaporization step into liquid or solid droplets or particles, customarily dispersed as an aerosol in the vapor phase.

The gaseous effluent from the evaporation unit is treated to remove this aerosol therefrom. For example, a separator column is usually provided downstream of the evaporator and may be constructed as or with a mist breaker, mist "collection" or other conventional mist-removal unit. For instance, it might be constituted as a bubble-plate column, a screen-plate column or a packed column containing a multiplicity of filter bodies.

In addition to the separator, demisters or mist breakers can be provided, e.g. in the form of thick wire mesh of steel or synthetic resin as are commonly used in the chemical arts in dealing with aerosol separation.

In the treatment of radioactive nuclear waste one should distinguish between the so-called system-decontamination factor ($DF_s$) and the vapor decontamination factor ($DF_v$).

The system decontamination factor $DF_s$ is the ratio of the specific activity of the waste water to that of the distillate and is of a value or quantity which is significant in dealings with respective control authorities such as governmental units. The evaporator decontamination factor $DF_v$ establishes a ratio between the specific activities of the concentrate and the distillate and can correspond approximately to 100 times ($10^2$) the system decontamination factor $DF_s$. The evaporator decontamination factor $DF_v$ is established by the parameters of the evaporator unit and hence by the manufacturer. Practical experience with known decontamination systems has shown that the assumed $DF_s$ values of $10^8$ to $10^{12}$ are not attained in operation but that, at best, $DF_s$ values of $10^4$ to $10^6$ can be obtained. The actual $DF_s$ values, moreover, decrease with duration of operation of the system.

Considerable investigation has shown that a primary reason for the low $DF_s$ values actually obtained is the continuous contamination of the fittings of the separator column because the particles to be separated from the vapor tend to deposit on the fittings or to promote deposition on surfaces thereof.

For high $DF_s$ values, therefore, efforts have been made to effect cyclical cleaning of the fittings, i.e. cleaning of the fittings after the lapse of a predetermined operating period, or replacement of the fittings. Both of these operations are expensive and time consuming, necessitating shutdown of the evaporation installation for long periods and to possible exposure of operating personnel to high radiation dosages.

OBJECTS OF THE INVENTION

It is the principal object of the present invention to provide an improved method of treating radioactively contaminated waste water so as to eliminate the disadvantages enumerated above.

Another object of the invention is to provide an improved apparatus for carrying out the method of the invention and thereby achieving a high decontamination rate at low cost.

Still another object of the invention is to provide a method of and an apparatus for the treatment of radioactively contaminated waste water so as to minimize the removal of radionuclides therefrom with high efficiency, minimum exposure of operating personnel to radioactive hazards and at low equipment cost.

SUMMARY OF THE INVENTION

These objects and others which will become apparent hereinafter are attained, in accordance with the present invention, by subjecting radioactive waste water, containing radionuclides adapted to form a dispersed liquid or solid aerosol phase in the water vapor upon evaporation, to vaporization, thereby producing a stream of water vapor in which the radionuclides are dispersed as an aerosol of droplets and/or solids, and removing the particles of the aerosol from the vapor by subjecting this aerosol to an electric field.

We have found, quite surprisingly, that a process of this type allows the removal or deposition of the radionuclides from the vapor of the waste water in an optimum manner without reduction of the $DF_s$ value over relatively long periods of operation. In fact, test have shown that by using a system in which an aerosol dispersion is first formed from the waste water and the radionuclides are selectively deposited from the dispersion by electrostatic field, the vaporizer decontamination factor $DF_v$ is improved by a factor of at least 100 ($10^2$) by comparison with vaporization processes used heretofore and employing separator columns of the type described. The vaporizer decontamination factors ($DF_v$) obtained with the present invention can correspond approximately to the system decontamination factors ($DF_s$) previously achieved.

Naturally, it is known in the field of dust removal from gases to provide so-called electrostatic precipitators in which solid particles, charged by a corona discharge, are deposited upon collector electrodes, of opposite polarity. As far as we know, such systems have not been applied heretofore for the decontamination of radioactive waste water, i.e. waste water containing radionuclides and generally have not found widespread application in the nuclear reactor field where liquid waste treatment is concerned, presumably because of the fear of contamination by the deposition of radionuclides.

Furthermore, electrical conductivity (S/cm) of particles which are separated out by dust removal systems of the aforedescribed type are so different from the conductivity of the radionuclide particles involved with the system of the present invention, it could scarcely be expected that the use of electrofilters as is the case with the present invention, would lead to markedly improved decontamination factors over those of separator columns.

In fact, even experienced workers in the field of processing radioactive waste water would have had to conclude, prior to our discoveries, that use of dust-removal electrostatic precipitation techniques would lead to less satisfactory decontamination factors than the separation procedures used earlier for the radioactive waste water, if only because of the relatively low concentration of particles (g/m$^3$) of the radionuclides in the vapor, the substantially different electrical conductivity, and the especially small particle size which would hardly be expected to be amenable to effective electroprecipitation.

Indeed the fact that electroprecipitation works at all with the aerosols generally by evaporation from the radioactive waste water, is unexpected and surprising.

According to a feature of the invention, the stream generated by vaporization of the radioactive waste water and containing the radionuclides in a dispersed aerosol form, is passed through at least two spaced-apart electric fields in succession, each field being controlled, established or designed so that it will result in an optimum removal of the particles present in the initial dispersion. This arrangement ensures that a failure of one of the fields will not give rise to less than optimum removal of the particles.

In accordance with another feature of the invention, the system provides an evaporator or vaporizer below a column formed with at least two electrostatic precipitation zones through which the vapors and dispersion rise.

It has been found to be advantageous, in this system, to initially introduce the vapor or dispersion in a tangential manner into the column below the electrostatic deposition zone, to deflect the stream of the dispersion downwardly and only then direct the dispersion upwardly through the electrostatic precipitation zones.

This technique varies the velocity of the dispersion (in meters per second) repeatedly to a high degree during its flow to the electric field zones, an action which markedly improves the separation effect in the region of these fields.

According to another aspect of the invention, the separation is carried out in an apparatus which comprises a circulation-type evaporator, i.e. an evaporator which produces the vapor and thereby forms a dispersion of radionuclides in the vapor phase by heating the radioactive waste water to a temperature above its boiling point in one leg of the apparatus while allowing recirculation of condensate and excess liquid by convection through the other legs to the heating elements or unit.

A separator column is connected with the circulation evaporator at one side, through the waste water or evaporator sump, in addition, through the vaporization chamber while a condenser and water collector is connected at the outlet side of the separator column.

Between the evaporator and the condenser, one or more electrical filter zones are provided in the column in the direction of flow of the dispersion. Preferably the zones are disposed above the evaporator chamber.

According to a specific feature of the invention, at least two electrical filters, structurally identical but capable of independent operation and each set for optimum separation, are disposed one above the other in the separator column of the present invention in spaced-apart relation.

For the tangential introduction of the dispersion into the electrofilter zones, we provide the outlet of the circulation evaporator so that it opens tangentially into the downstream open annular space beneath the first electrical filter. This chamber of space can have a passage coaxial with the annular chamber and the electrofilter.

Beneath the first electrofilter and above the passage there can be provided means, including a switching circuit, which activates a foam-breaking device, such as a heater, when foam or froth is formed by a short-circuit operation of the first electrical filter. The heating unit may be a grid and the foam-breaking system may also be a spray ring in which liquid is directed into the vapor to preclude the formation of foam or to destroy any quantity of foam which may have occurred.

The formation of foam has been found to be a problem especially with radioactive waste water operating under alkali conditions, i.e. with a pH above 7 as is the case when iodine-131 must be reduced so that it can form part of the dispersed phase in the aerosol for separation.

According to yet another feature of the invention, the electrodes of the electrofilters are provided with washing and liquid-collection means so that the collecting electrodes of the electrofilter can be washed down during periods in which the apparatus is idle or periodically. The washing means can be in part accommodated in the spaces between successive filter sections.

The separating plant described has been found to be free from the disadvantages of the prior art and to achieve all of the objects set forth above.

BRIEF DESCRIPTION OF THE DRAWING

The above and other objects, features and advantages of the present invention will become more readily apparent from the following description, reference being made to the accompanying drawing, and specific examples.

In the drawing

SPECIFIC DESCRIPTION AND EXAMPLES

Figure 1:
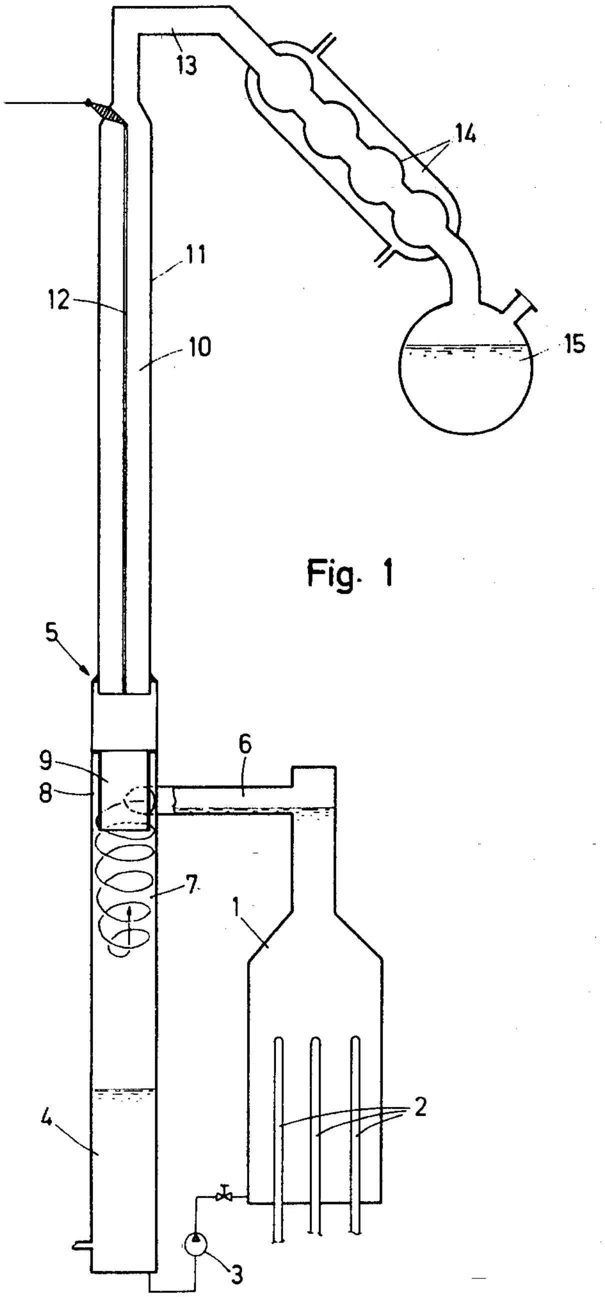
FIG. 1 is a diagrammatic elevational view of an apparatus illustrating the principles of the present invention.

The arrangement shown in FIG. 1 comprises a circulation evaporator 1 with electric heating elements 2 having a stabilized heating output of 8 KW. This circulation evaporator 1 was connected on one side, with interposition of a pump 3, to the waste water or evaporator sump 4 of a separator column 5 and, on the other side, through a connecting pipe 6, to the vaporization chamber 7 of this separator column 5.

The connecting pipe 6 opens tangentially into an annular chamber 8 which was open in a downward direction to the vaporization chamber 7 and the latter was connected coaxially to the annular chamber 8 by way of a passage 9 having an electrofilter 10 arranged thereabove. The electrofilter 10 was operated with high-voltage direct current of 13.5 kV and comprised, firstly, a tubular deposition electrode 11 and, secondly, a discharge electrode 12 formed by a wire coaxial with the deposition electrode 11.

The upper end of the deposition electrode 11 of the electrofilter was connected by way of a tube 13 and with interposition of a condenser 14 to a distillate collector 15.

Various test series were carried out with this test installation which was produced with the use of glass vessels or flasks, firstly with the use of an aqueous solution of inactive sodium and secondly with the use of radioactive waste water.

In the former case, the solution which was introduced was composed of different washing or flushing agents, of boric acid, sodium chloride, sodium tetraborate, silicone oil and non-foaming agents and was brought to a value of $5.14\times10^6$ ppb of sodium.

In the tests which were carried out, it was shown that, with a strictly evaporator operation, i.e. with the electrofilter switched off, the sodium content in the condensate could be lowered to 140 ppb. In this case, therefore, a decontamination factor of $3.7\times10^4$ was obtained.

If it happened that the electrofilter was additionally included in the same series of tests, it was then possible for the sodium content in the condensate to be lowered to 6 ppb. As a consequence, a minimum decontamination factor of $0.85\times10^6$ was obtained, since the residual traces of sodium certainly originate from the glass vessels being used. It was therefore possible, by using the electrofilter, for the decontamination factor to be improved by $4.35\times10^2$.

In the series of tests, using radioactive waste water, untreated water was used, in which were contained, inter alia, the radionuclides listed in column 1 of the following table. Set out in column 2 of this table is the measured radiation activity Ci/m$^3$ in respect of the individual radionuclides, which activity was present before the untreated water was introduced into the vaporizer.

Indicated in column 3 of the table is an experiment in which the circulation evaporator 1 was operated with a heating power of 8 kW and a water level with a height of 440 mm was maintained in the untreated water sump 4 of the column 5.

Listed in column 3.1 are the radiation activities Ci/m$^3$ in respect of the radionuclides indicated in column 1, which activities were measured in the condensate with a strictly evaporator operation of the test installation, while column 3.2 indicates the radiation activities Ci/m$^3$, which have been adjusted in the condensate after additionally including the electrofilter in the circuit.

Column 4 of the table sets out the values of an experiment in which the evaporator was operated with a heating power of 6 kW and the water level in the untreated water sump 4 was likewise kept at a height of 440 mm. In this connection, column 4.1 indicates the values of the radiation activities Ci/m$^3$, which were obtained with a strict evaporator operation, while the column 4.2 reproduces the radiation activities Ci/m$^3$ which were established after the electrofilter had been additionally incorporated into the circuit.

Set out in column 5 of the table is a comparison test with that according to column 4, which was, however, carried out with a slight change in the quantity of vaporized water and of the volume of the evaporation chamber 7, and from the resultant change in the vaporization speed and also of the residence time in the electrofilter. The correspondingly modified values are in each case indicated at the bottom of the table in respect of the separate columns.

Also indicated in column 5, under 5.1., are the radiation activities Ci/m$^3$, which were measured in the condensate with a strictly evaporator operation, while 5.2 indicates the data which were established after switching on the electrofilter.

Finally, column 6 of the table represents an experiment in which the evaporator was operated with a heating power of 8 kW, with which, however, the water level in the untreated steam 4 was only kept at a height of 140 mm.

If the values for the Co-60 (cobalt-60) which is particularly radiation-active in the untreated water are taken from the table, the said cobalt-60 showing a measured radiation activity of $1.2\times10^{-1}$ Ci/m$^3$, then it is shown in respect of the test according to column 3 of the table that, in accordance with 3.1., i.e. with pure evaporator operation, the radiation activity could be reduced to $1.19\times10^{-6}$ Ci/m$^3$, while in accordance with 3.2., the radiation activity could be further lowered to $8.23\times10^{-10}$ when operating with an incorporated electrofilter. It was therefore possible for the evaporator decontamination factor ($DF_v$) to be improved by $1.45\times10^3$ by incorporation of the electrofilter.

As regards the second test which is shown in column 4, it was established according to 4.1., with strict evaporator operation, that there is a fall in the radiation activity of $7.92\times10^{-7}$ Ci/m$^3$, whereas in accordance with 4.2., when operating with an evaporator with an incorporated electrofilter, there is established a reduction in the radiation activity of $8.23\times10^{-10}$. Consequently, an improvement in the evaporator decontamination factor ($DF_v$) by $9.62\times10^2$ was obtained.

With the third test, according to column 5 of the table, and in accordance with the data given under 5.1., a fall in the radiation activity to $2.8\times10^{-7}$ Ci/m$^3$ was achieved, whereas it is indicated, under 5.2., with additional incorporation of the electrofilter, that the radiation activity in the condensate is reduced to below a value of $1.6\times10^{-8}$ Ci/m$^3$ the verification limit which is available in this connection.

Despite the use of a less sensitive CeLi radiation detector (germanium-lithium detector), it was also possible to prove in this case that the evaporator decontamination factor ($DF_v$) is improved by more than $1.75\times10^1$ by the use of the electrofilter

| 1 Individual nuclide | 2 Radiation activity in untreated water Ci/m$^3$ | 3 Experiment 1 Radiation activity in the condensate Ci/m$^3$: 3.1 without e-filter | 3.2 with e-filter | 4 Experiment 2 Radiation activity in the condensate Ci/m$^3$: 4.1 without e-filter | 4.2 with e-filter | 5 Experiment 3 Radiation activity in the condensate Ci/m$^3$: 5.1 without e-filter | 5.2 with e-filter | 6 Experiment 4 Radiation activity in the condensate Ci/m$^3$: 6.1 without e-filter | 6.2 with e-filter |
|---|---|---|---|---|---|---|---|---|---|
| Ag - 110 m | $1.67 \cdot 10^{-3}$ | $5.64 \cdot 10^{-7}$ | $4.7 \cdot 10^{-10}$ | $1.8 \cdot 10^{-7}$ | $4.7 \cdot 10^{-10}$ | $2.6 \cdot 10^{-7}$ | Radiation | $2.5 \cdot 10^{-7}$ | Radiation |
| Cs - 137 | $2.1 \cdot 10^{-2}$ | $7.42 \cdot 10^{-7}$ | $6.0 \cdot 10^{-8}$ | $4.68 \cdot 10^{-7}$ | $6.77 \cdot 10^{-10}$ | $4.8 \cdot 10^{-7}$ | activity | $5.7 \cdot 10^{-7}$ | activity |
| Cs - 134 | $5.4 \cdot 10^{-3}$ | $2.47 \cdot 10^{-7}$ | $4.11 \cdot 10^{-10}$ | $1.9 \cdot 10^{-7}$ | $4.01 \cdot 10^{-10}$ | $1.7 \cdot 10^{-7}$ | less than | $1.5 \cdot 10^{-7}$ | less than |
| Co - 60 | $1.2 \cdot 10^{-1}$ | $1.19 \cdot 10^{-6}$ | $8.23 \cdot 10^{-10}$ | $7.92 \cdot 10^{-7}$ | $8.23 \cdot 10^{-10}$ | $2.8 \cdot 10^{-7}$ | $1.6 \cdot 10^{-8}$ | $6.5 \cdot 10^{-7}$ | $1.6 \cdot 10^{-8}$ |
| Sb - 124 | $3.5 \cdot 10^{-2}$ | $4.21 \cdot 10^{-7}$ | $8.6 \cdot 10^{-10}$ | $2.29 \cdot 10^{-7}$ | $8.6 \cdot 10^{-10}$ | $3.5 \cdot 10^{-7}$ | | $4.1 \cdot 10^{-7}$ | |
| Remarks | pH = 6 | Vaporizer heating power: 8 kW/h<br>Water level: 440 mm<br>Vaporizer output: 0.005 m$^3$/s<br>Vapor velocity: in evaporator chamber: 0936 m/s<br>in the e-filter: 1.7 m/s<br>residence time in the e-filter: 0.45 sec.<br>filter voltage 14.2 kV$_2$<br>at 140 μA = 0.927 mA/m$^2$ | | Vaporizer heating power: 6 kW/h<br>Water level: 440 mm<br>Vaporizer output: 0.00425 m$^3$/s<br>Vapor velocity: in evaporator chamber: 0.795 m/s<br>in the e-filter: 1.5 m/s<br>residence time in the e-filter: 0.53 sec.<br>filter voltage 14 kV<br>at 160 μA = 1.06 mA/m$^2$ | | Vaporizer heating power: 6 kW/h<br>Water level: 440 mm.<br>Vaporizer output: 0.0045 m$^3$/s<br>Vapor velocity: in evaporator chamber: 0.842 m/s<br>in the e-filter: 1.59 m/s<br>residence time in the e-filter: 0.5 s.<br>filter voltage 14 kV<br>at 190 μA = 1.26 mA/m$^2$<br>Measurement point with poor detection limit | | Vaporizer heating power: 8 kW/h<br>Water level: 140 mm.<br>Vaporizer output: 0.004 m$^3$/s<br>Vapor velocity: in evaporator chamber: 0.749 m/s<br>in the e-filter: 1.42 m/s<br>residence time in e-filter: 0.56 s.<br>filter voltage 15 kV<br>at 140 μA = 0.927 mA/m$^2$<br>Measure point with poor detection limit | |

e-filter = electrofilter

Under 6.1., purely with evaporator operation, a radiation activity of $6.5 \times 10^{-7}$ Ci/m$^3$ is indicated, while it can be seen under 6.2. that, with additional use of electrofilter, the radiation activity of the condensate must likewise be arranged below the detection limit of $1.6 \times 10^{-8}$ Ci/m$^3$. In this case, an improvement of the evaporator decontamination factor ($DF_v$) by the value of $4.06 \times 10^{-1}$ is obtained. Used for detecting the radiation activity in this case was the same GeLi detector as that used in the experiment indicated in column 5.

Figure 2:
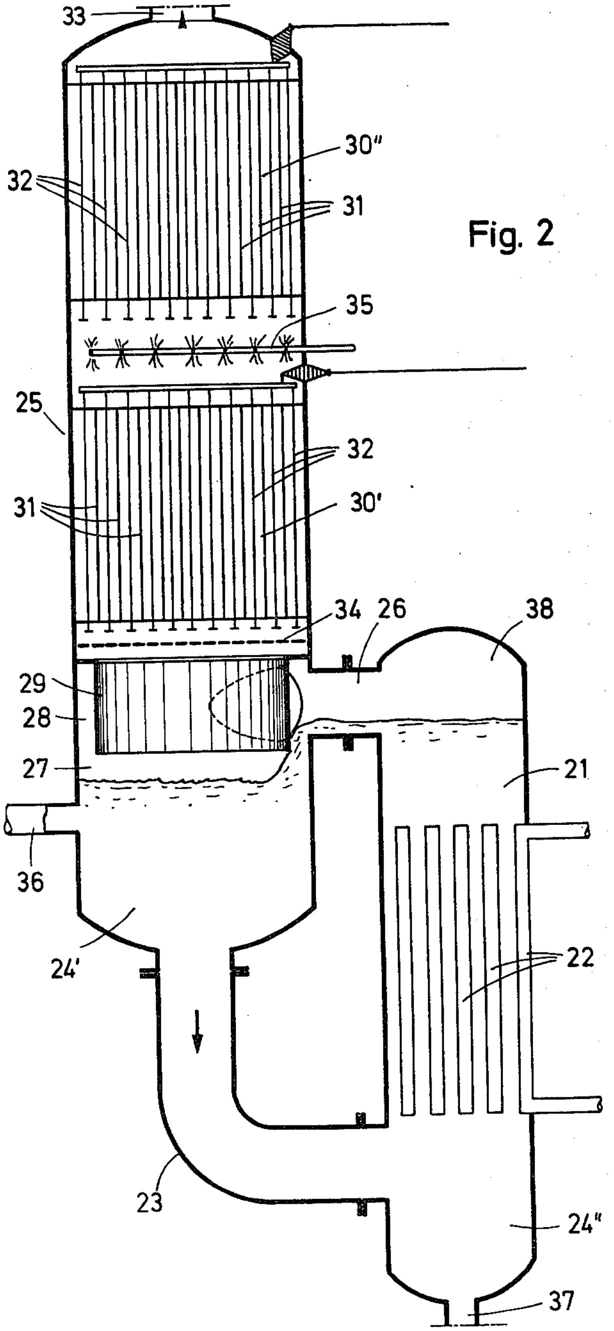
FIG. 2 is a diagrammatic vertical section through a commercial scale apparatus embodying the invention.

Represented in FIG. 2 of the drawing is an installation suitable for practical use for the decontamination of radioactive waste water. This installation has an evaporator 21, which can be operated through a pipe register 22 by heating steam. This evaporator is provided with a flow connection at its lower end and by way of a pipe 23 with the bottom of a decontamination column 25, while it is also connected to the decontamination column 25 near its upper end through pipe unions or fittings 26. The said unions 26 open tangentially into an annular chamber 28, which communicates at the bottom with an evaporation chamber 27, which is formed above the level of untreated water in the decontamination column 25.

Projecting into the evaporation chamber 27 from above and concentrically of the annular chamber 28 is a short pipe 29. This constitutes a connection with a space in the decontamination column 25 which is disposed above the evaporation chamber and in which two electrofilters 30′ and 30″ are arranged spaced one above the other.

The two electrofilters 30′ and 30″ are of a corresponding design. They each consist of a number of deposition or collecting electrodes 31 and discharge electrodes 32. The collecting electrodes consist either of vertical plates, between which the discharge electrodes, in the form of wires, are suspended vertically, or of tubes inside which extend the discharge electrodes.

In order to produce high field intensity between the discharge electrodes negative polarity and the collecting electrodes, both electrofilters 30′ and 30″ are connected separately from one another to high-voltage direct current sources, so that they can be operated and regulated independently of one another.

The upper end of the decontamination column 25 comprises a vapor discharge tube 33, which communicates with a condenser (not shown).

Beneath the lower electrofilter 30′, but above the annular chamber 28 and the short pipe 29, a foam brake 34 is incorporated into the decontamination column 25, which brake is for example in the form of a heating grid or spray ring, while washing or scrubbing devices 35 are arranged in the space between the two electrofilters 30′ and 30″, which devices are able to spray a washing or scrubbing medium simultaneously into the two filters 30′ and 30″.

The radioactive waste water is introduced in a regulatable quantity through a pipe conduit 36 into the decontamination column 25 close to the bottom end thereof and flows from this point through the pipe conduit 23 into the evaporator 21.

The bottom end of the decontamination column 25 forms a sump 24′ for untreated water, and said sump being connected through the pipe 23 to the evaporator 21. Formed beneath the inlet opening of the pipe 23 in the evaporator 21 is a sump 24′ for concentrate, from which extends a pipe 37 for discharging the concentrate.

The natural water which flows from the untreated water sump 24′ through the pipe 23 into the evaporator 21 rises, according to the principle of the communicating pipes inside the evaporator 21, to the height which corresponds to the untreated or natural water level in the sump 24' of the decontamination column 25. The water is superheated in the evaporator 21 by the tube register 22, so that it is expanded and on the one hand ascends to the height of the pipe union 26 and also on the other hand rises as vapor into the dome 38.

Some of the heated water then flows back through the pipe union 26 into the natural water sump 24' of the decontamination column 25, so that a positive circulation is established between the latter and the evaporator 21. On the other hand, the vapor which is ascending, for example, at a velocity of 2 m/s into the dome 38 passes over with an increased flow velocity of, for example, 10 m/s, tangentially into the annular chamber or space 28. From the latter, the vapor then initially flows with a peripheral motion through the annular chamber 28 downwardly into the evaporation chamber 27, is deflected therein by the water level of the natural water and thereupon flows upwardly again at a reduced velocity of for example 1 m/s through the short pipe 29.

The vapor then flows through the electrostatic high-voltage direct-current fields of the two electrofilters 30' and 30", the radionuclides entrained by the vapor, irrespective of whether they occur as solid particles or even as dissolved salts or as suspended colloids in the form of aerosols, are separated out in the two electrofilters 30' and 30".

So that also volatile radionuclides, as for example, iodine-131, can be separated out in the electrofilters 30' and 30", these have to be reduced $(I_2+2e^{31}=2I^-)$, so that they pass in ionizable form into the aerosol. In the case of iodine-131, it is necessary for the decontamination plant to be operated in the alkali range, i.e. with pH values greater then 7. The alkali procedure in the operation of the decontamination arrangement may however involve a strong formation of foam inside the evaporator 21, the foam having the tendency to ascend into the separation zone. However, this tendency to foam formation must be prevented because the separator section can be contaminated after a short operational period by ascending foam and as a result lead to an undesirable lowering of the decontamination factors.

The foam breaker 34, designed either as a heating grid or even as a spray ring, automatically completely counteracts an upward movement of foam in the separator section of the decontamination column 25. The foam breaker 34 does in fact coact with the lower electrofilter 30'. This latter can be so designed that it then reacts with electric disruptive discharges and short-circuiting behavior, when its bottom end comes into contact with the ascending foam. The short-circuiting behavior of the bottom electrofilter 30' can be utilized as a switching pulse, which through a switching circuit automatically sets the foam breaker 34 in operation, so that further ascent of the foam is prevented and its reformation is caused.

Since the upper electrofilter 30" is still completely in operation with a short-circuit in the lower electrofilter 30', the efficiency of the decontamination column 25 is not impaired.

Since all separation surfaces are arranged substantially vertically in the two electrofilters 30' and 30", it is also a comparatively easy matter to clean the said surfaces during the periods when the decontamination plant is not operating. It is in fact then only necessary to set in operation the washing device 35 which is installed in the decontamination column 25 between the two electrofilters 30' and 30". The said device then sprays a suitable washing medium, for example, a washing liquid, onto the separation surfaces, so that the residues which are adhering thereon are detached and flow downwardly in the decontamination column 25. They then reach the untreated water sump 24' and possibly continue to pass through the pipe 23 into the vaporizer sump 24", from which they can be drawn off through the pipe 37.

In the constructional example, the two electrofilters 30' and 30" are arranged one above the other. However, it is obvious that also another arrangement in space is possible, without departing from the scope of the invention. Thus, it may be expedient in particular cases, for example, if the electrofilters are disposed in a horizontal arrangement adjoining the evaporation chamber.

We claim:

1. An apparatus for decontaminating radioactive waste water comprising:
   - a circulation evaporator for vaporizing the radioactive waste water to produce a stream of water vapor containing radionuclide particles dispersed as an aerosol in said stream, said circulation evaporator including a heating branch, an evaporation chamber, a water collecting sump, and means for returning water from said sump to said branch;
   - a separator column extending upwardly from said chamber for receiving said stream and removing said particles of said aerosol from the water vapor thereof;
   - means in said separator column for generating at least one electric field for the electrostatic deposition of said particles from said stream;
   - means connected to the top of said column for condensing said water vapor subsequent to the electrostatic precipitation of said particles therefrom
   - said evaporator having a supply pipe for said stream opening tangentially into an annular space open downwardly toward said chamber, said chamber having a passage connected to said column and coaxial with said space; and
   - a foam brake activated upon shortcircuiting of the means generating said electric field and disposed between the last-mentioned means and said passage.

2. The apparatus defined in claim 1, further comprising washing means for washing electrodes forming the means for generating said electric field.

3. The apparatus defined in claim 2 wherein two electrofilters are provided in said column in spaced-apart relationship and contain said electrodes, said washing means being disposed between said electrofilters in said column.

* * * * *